Patented Oct. 21, 1930

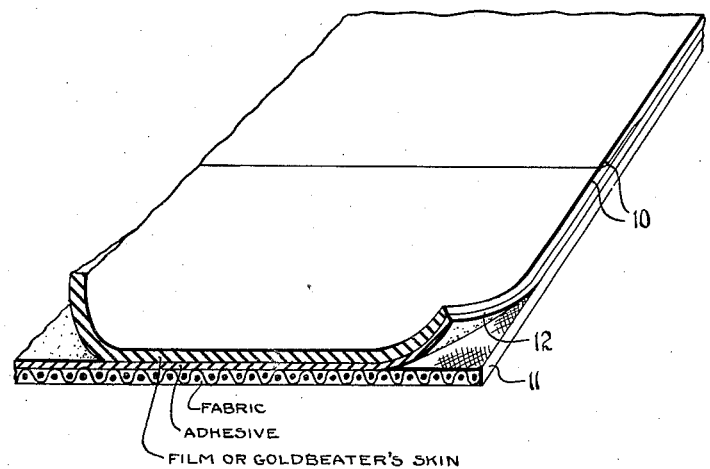

1,779,395

UNITED STATES PATENT OFFICE

KARL HUERTTLE, OF AKRON, OHIO, ASSIGNOR TO GOODYEAR-ZEPPELIN CORPORATION, OF AKRON, OHIO, A CORPORATION OF DELAWARE

METHOD OF MAKING GAS-CELL MATERIAL

Application filed November 17, 1927. Serial No. 234,049.

My invention relates to gas cells for airships and it has particular relation to a method of manufacturing material employed in the construction of such cells.

The object of the invention is to provide a convenient method of manufacturing gas cell material by which many of the disadvantages heretofore encountered in applying goldbeater's skin, or other transparent or colorless material to a fabric base can be obviated.

The material employed for manufacturing gas cells must be impervious to gas, and, heretofore, it generally consisted of a sort of textile fabric to which thin layers of material, such as goldbeater's skin, gelatin film, cellulose film, etc., were applied in order to render the material gas tight. Because of the thinness of the gas-tight layers and the transparency and colorless nature thereof, it was difficult to distinguish the portion of the fabric which had been provided with a gas-tight layer from that which had not been so provided. Consequently there were many imperfections or foreign matter, such as dust, present in the material after the application of the goldbeater's skin or other impermeable material, such imperfections including excessively overlapped edges forming the seams and irregularly or insufficiently overlapped edges. These defects could be detected only by painstaking inspection.

This invention illustrated by the single figure of the accompanying drawing, obviates these disadvantages by dyeing or printing readily discernible colors upon goldbeater's skin or other films 10 before they are applied to the fabric 11. The dyeing or coloring matter may be added to adhesives 12 which are employed in uniting the skins or films with the fabric or the latter may be colored directly.

After the application of the goldbeater's skin to the fabrics has been commenced a casual observer may clearly determine at a glance the lines of demarkation between the portions of the fabric upon which the films have been applied and those upon which the films have not been applied. Moreover, the detection of openings or spots caused by defects in a layer of material is greatly facilitated. Also, the application of the layers of film to the fabric is greatly simplified, because the edges of the single layer pieces already applied to the fabric are clearly visible and the proper overlapping and positioning of the pieces is therefore readily accomplished. Thus the seams of a colored layer of material are uniform and waste of material or overweight resulting therefrom is avoided.

The sort of dyeing or coloring material employed is preferably that which does not perceptibly increase the weight of the goldbeater's skin or the film, or of the adhesive. A dye having such characteristics that will lend protection against light and heat rays will increase the effectiveness of the gas cell material. Also, the material should be treated with a substance that will protect it from atmospheric influences.

From the foregoing description, it will be apparent that the invention provides for the manufacture of a gas cell material in such manner as to facilitate the application of goldbeater's skin, gelatin film or cellulose film thereto, as well as to facilitate the repairing of the material after it has been in service, and also that the inspection of a finished gas cell may satisfactorily be accomplished without resorting to the use of special devices of the type heretofore required in properly conducting the inspection.

Although only the preferred applications of the invention have been disclosed and described in detail, it will be apparent to those skilled in the art that it is not so limited but that various minor modifications may be made therein without departing from the spirit of the invention or from the scope of the appended claims.

What I claim is:

1. A method of manufacturing gas cell material composed of layers of textile and normally transparent gas-tight material that comprises treating a plurality of pieces of the gas-tight material with a coloring substance to increase their visibility, and subsequently successively uniting the pieces upon and with the textile with the edges of the pieces overlapped.

2. A gas cell material for aircraft comprising a layer of fabric and a layer of gold beater's skins, said skins having a clearly visible coloring matter applied thereto to facilitate uniform application thereof to the fabric.

3. A gas cell material comprising layers of fabric and normally transparent gold beater's skins, means for increasing the visibility of the gold beater's skins including adhesive coloring matter applied thereto, all of said layers being united.

In witness whereof, I have hereunto signed my name.

Signed at Akron, in the county of Summit, and State of Ohio, this 16th day of November, 1927.

CARL HUERTTLE.